H. G. LIEBZEIT.
PASTEURIZING APPARATUS.
APPLICATION FILED SEPT. 25, 1919.
1,371,038.
Patented Mar. 8, 1921.
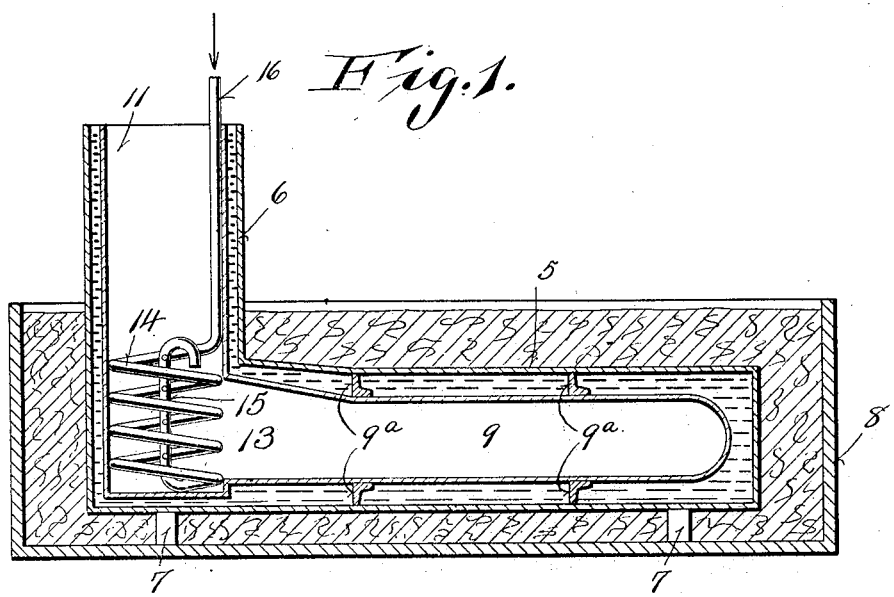
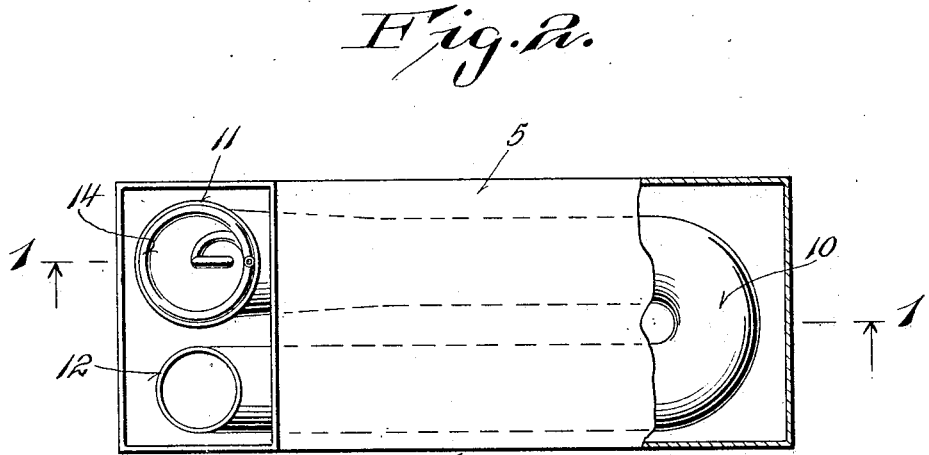
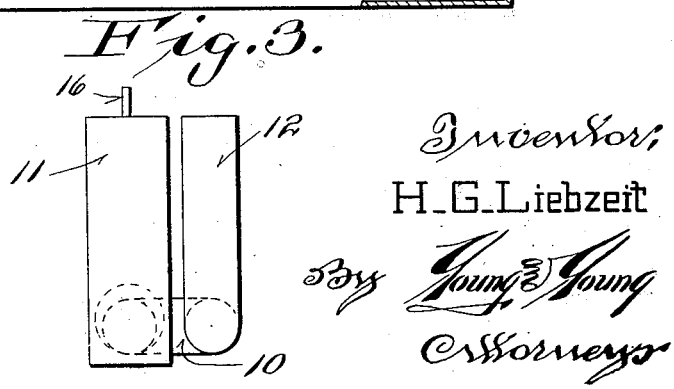
Inventor:
H. G. Liebzeit

UNITED STATES PATENT OFFICE.

HENRY G. LIEBZEIT, OF PLYMOUTH, WISCONSIN.

PASTEURIZING APPARATUS.

1,371,038.   Specification of Letters Patent.   Patented Mar. 8, 1921.

Application filed September 25, 1919. Serial No. 326,404.

*To all whom it may concern:*

Be it known that I, HENRY G. LIEBZEIT, a citizen of the United States, and resident of Plymouth, in the county of Sheboygan and State of Wisconsin, have invented certain new and useful Improvements in Pasteurizing Apparatus; and I do hereby declare that the following is a full, clear, and exact description thereof.

My invention relates to new and useful improvements in heating or pasteurizing apparatus, more particularly of that type comprising a burner unit including heat distributing flue portions, said unit being adapted to be removably positioned in a whey tank or other receptacle.

It is in general the object of my invention to increase the efficiency and the convenience of manipulation of devices of this character, and inasmuch as practice has demonstrated that burning of the whey may occur upon engagement of the burner flues directly with the body of whey, it is more particularly an important object of my invention to provide an arrangement wherein the heat generated by the burner is evenly distributed throughout the entire whey contacting surfaces of the burner unit, thus also facilitating rapidity of heating of the flue by a uniform distribution of the heat.

It is further my object to provide a heating apparatus of this character having heat distributing surfaces which may be most readily cleaned, while at the same time there is provided an ample expanse of radiating surface for the burner flues, and I effect this and the foregoing objects by the disposition of the burner and flues in a heat distributing water jacket.

With the above and other objects and advantages in view, which will be apparent as the description proceeds, my invention resides in the novel features of construction, combination and arrangement of parts, which will be hereinafter more particularly described and defined by the appended claim.

In the accompanying drawings:

Figure 1 is a vertical longitudinal sectional view through a whey tank and through my improved heating apparatus associated therewith, the plane of this section being indicated by the line 1—1 of Fig. 2.

Fig. 2 is a plan view of the heating apparatus, a portion of the jacket casing being broken away.

Fig. 3 is an end view of the flue structure of the apparatus.

Referring now more particularly to the accompanying drawings, I provide an outer or jacket casing comprising an elongated horizontal section 5 of oblong cross section, which is connected at one end with a vertical section 6 also of oblong cross section, the casing section 5 being adapted to rest upon supports 7 in the bottom of a whey tank 8, whereby the section 5 and the lower portion of the section 6 may be immersed in the whey contents of the tank. Disposed in the horizontal section 5 of the casing is a flue structure comprising a pair of longitudinally extending sections 9 connected together at the closed end of the section 5 by a bend 10 to provide a U-shaped flue arrangement, the other ends of the sections 9 being connected with vertical inlet and outlet sections 11 and 12 respectively disposed in the vertical jacket sections 6. The inlet section 11 is of greater diameter than the outlet section 12 and its corresponding longitudinal flue section 9 is taperingly increased in diameter theretoward at 13. The longitudinal sections 9 are supported in the jacket casing by spacer members 9$^a$, and thus the entire flue structure is held in spaced relation to the walls of the outer or jacket casing whereby to provide a jacket space which is filled with water. A suitable burner is disposed in the inlet flue section 11, said burner comprising in the present instance a generating coil 14 disposed in the lower portion of the flue section and terminating in a burner jacket pipe 15 extending axially in the coil, said coil being supplied with fuel liquid by a pipe 16 extended upwardly through the flue sections.

I have thus provided an exceedingly simple and efficient apparatus which will rapidly effect a pasteurizing or other heating operation without the danger of burning the material to be heated, it being particularly noted that my jacket arrangement possesses the particular function in the present construction of distributing the heat generated by the apparatus throughout the entire jacket casing so that the heat is distributed uniformly from all of the surfaces of the jacket casing, it being noted that an excessive amount of heat would be radiated from the flue structure immediately adjacent the burner, while a comparatively slight amount of heat would be radiated from the terminal portions of the flue structure. The various flue sections define a tortuous passage for the combustion gases, such tortuous passage has a cylindrical radiating surface, but this surface is not exposed to the work material since its heating action is taken up by the water in the jacket space and a most ready cleansing of the device may thus be effected by reason of the plain surfaces of the outer or jacket casing which are exposed to the work material.

While I have shown and described a prefered embodiment of my invention, it will be appreciated that various changes and modifications of structure may be employed to meet differing conditions of use and manufacture, without departing in any manner from the spirit of my invention.

What is claimed is:

A heating apparatus of the class described comprising an elongated water jacket casing having an upward extension at one end, a U-shaped flue structure disposed in said jacket casing and having cylindrical upward extensions disposed in said upward extension of the jacket casing, and a burner disposed in one of said upward extensions of the flue structure, said last named extension being of greater diameter than the other flue extensions and one end portion of the U-shaped flue structure being tapered to connect therewith thus forming a funnel to receive the products of combustion from the burner.

In testimony that I claim the foregoing I have hereunto set my hand at Plymouth, in the county of Sheboygan and State of Wisconsin.

HENRY G. LIEBZEIT.